United States Patent [19]

Hidaka et al.

[11] Patent Number: 4,730,320
[45] Date of Patent: Mar. 8, 1988

[54] SEMICONDUCTOR MEMORY DEVICE

[75] Inventors: Hideto Hidaka; Kazuyasu Fujishima; Masaki Kumanoya; Hideshi Miyatake; Katsumi Dosaka; Tsutomu Yoshihara, all of Itami, Japan

[73] Assignee: Mitsubishi Denki Kabushiki Kaisha, Tokyo, Japan

[21] Appl. No.: 825,869

[22] Filed: Feb. 4, 1986

[30] Foreign Application Priority Data

Feb. 7, 1985 [JP] Japan .................. 60-23182
Feb. 20, 1985 [JP] Japan .................. 60-33731
Feb. 20, 1985 [JP] Japan .................. 60-33732
Sep. 26, 1985 [JP] Japan .................. 60-215472

[51] Int. Cl.$^4$ .......................................... G06F 11/10
[52] U.S. Cl. ........................................ 371/38; 371/21; 324/73 R
[58] Field of Search .................. 371/3, 38, 21; 324/73 R, 73 AT; 364/200 MS File, 900 MS File; 365/201

[56] References Cited

U.S. PATENT DOCUMENTS

| 4,319,356 | 3/1982 | Kocol | 371/38 |
| 4,359,771 | 11/1982 | Johnson | 371/3 X |
| 4,404,519 | 9/1983 | Westcott | 324/73 AT |
| 4,502,140 | 2/1985 | Proebsting | 324/73 R |
| 4,523,314 | 6/1985 | Burns | 371/38 |
| 4,531,213 | 7/1985 | Scheuneman | 371/3 |
| 4,608,669 | 8/1986 | Klara | 371/21 X |

OTHER PUBLICATIONS

"Error-Correcting Codes for Semicoductor Memory Applications: A State-of-the-Art Review", C. L. Chen et al, IBM J. Res. Develop., vol. 28, No. 2, Mar. 1984, pp. 124–134.
"Dynamic Testing of Memory Arrays Which Utilise ECC Logic", M. D. Quinn et al, Electronic Engineering, Mid-Mar. 1981, pp. 111–119.

Primary Examiner—Jerry Smith
Assistant Examiner—Robert W. Beausoliel, Jr.
Attorney, Agent, or Firm—Lowe, Price, Leblanc, Becker & Shur

[57] ABSTRACT

A semiconductor memory device comprises a data input switching circuit (20) connected between the output side of a write check bit generating circuit (2) and the input side of a check bit memory cell array (32), a data output switching circuit (30) connected to the input side of an address decoder (9), and an address switching circuit (10) connected to the output side of the address decoder (9). When a test mode is entered, the data input switching circuit (2), data output switching circuit (30) and address switching circuit (10) connect a data input signal line (l), data output signal line (m) and address signal line (n), respectively, to the check bit memory cell array (32), enabling the check bit memory cell array (32) to be accessed from the outside.

22 Claims, 12 Drawing Figures

SEMICONDUCTOR MEMORY DEVICE

BACKGROUND OF THE INVENTION

1. Field of the Invention

This invention relates to a semiconductor memory device. More particularly, it relates to a semiconductor memory device having an error detecting and correcting (hereinafter referred to as ECC) function.

2. Description of the Prior Art

In recent years, with the advance of the degree of integration of semiconductor memory devices, the malfunction of memory cells due to penetration of α particles, or soft error, has become a problem. As a countermeasure, on-chip ECC having ECC function on the same semiconductor board has been used. For such on-chip ECC, refer to "Error-Correcting Codes for Semiconductor Memory Applications: A State-of-the-Art Review" IBM J. RES. DEVELOP VOL 28, No. 2 MARCH 1984, Japanese Patent Application Laid-Open No. 143600/1981 entitled "Device for Preventing Accumulation of Errors on Data," and "Dynamic testing of memory arrays which utilise ECC logic" Electronic Engineering Mid-March, 1981.

Figure 1:
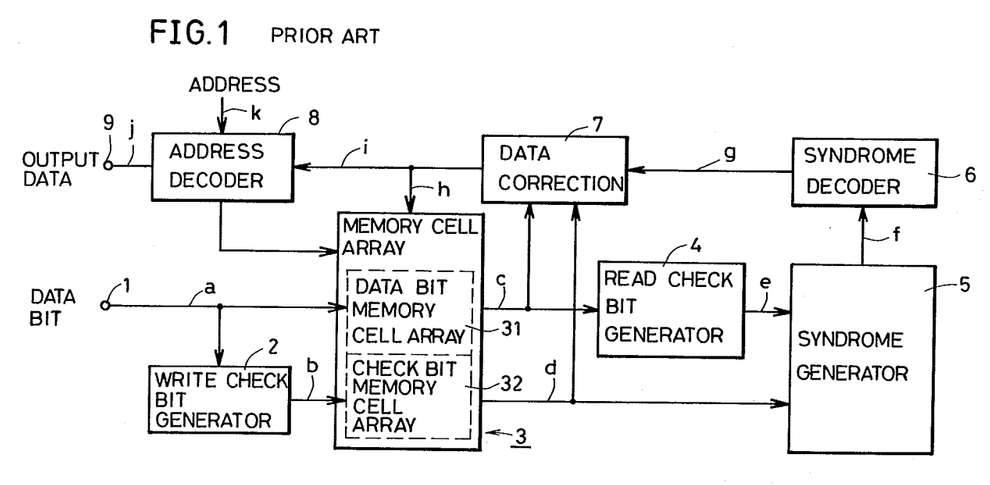
FIG. 1 is a block diagram of a convention on-chip ECC semiconductor memory device using the Hamming code as an error correcting code.

FIG. 1 is a block diagram of a conventional on-chip ECC semiconductor memory device using the Hamming code as an error correcting code.

First, referring to FIG. 1, a conventional on-chip ECC semiconductor memory device will be described. Data bits a are inputted to an input terminal 1. The data bits a are given to a write check bit generating circuit 2 and a data bit array 31 included in a memory cell array 3. The write check bit generating circuit 2 serves to generate write check bits b from the data bits a. Write check bits b generated in the write check bit generating circuit 2 are given to a check bit array 32 included in the memory cell array 3. The data bit array 31 serves to output new data bits c from the inputted data bits a. The new bits c are given to a read check bit generating circuit 4 and to a data correcting circuit 7. The check bit array 32 serves to output new write check bits d on the basis of the write check bits b. The new write check bits d are given to a syndrome generating circuit 5 and to a data correcting circuit 7.

On the basis of the inputted data bits c, the read check bit generating circuit 4 generates read check bits e, which are then given to the syndrome generating circuit 5. The syndrome generating circuit 5 has an exclusive-OR function and outputs a syndrome f. This syndrome f is given to a syndrome decoder 6. The syndrome decoder 6 decodes the syndrome f to output syndrome decode data g, which is given to the data correcting circuit 7. The data correcting circuit 7 corrects the data bits c and write check bits d on the basis of the syndrome decode data g and outputs corrected data h and external output-purpose data i. The corrected data h outputted from the data correcting circuit 7 is given to the memory cell array 3, while the external output-purpose data i is given to an address decoder 8. The address decoder 8 serves to select, on the basis of an address signal k, external output data j to be outputted to the outside from the external output-purpose data i, the selected external output data j being outputted to an output terminal 9.

The operation of the on-chip ECC semiconductor memory device shown in FIG. 1 will now be described. At the time of writing of $m_0$ data bits a inputted to the input terminal 1, the write check bit generating circuit 2 generates write check bits (e.g., k bits) b with respect to a plurality of data bits (e.g., m bits) including data bits a. These write check bits b and m data bits a are written to the check bit memory cell array 32 and data bit memory cell array 31. A block of said (m+k) bits is used as a unit for ECC, the error detection and correction being made for each block.

At the time of reading of data from the memory cell array 3, m data bits c and k write check bits d are simultaneously read. The read check bit generating circuit 4 generates read check bits e as new check bits from said m data bits c. The syndrome generating circuit 5 finds the exclusive-OR, bit by bit, of read check bits e and write check bits d read from the memory cell array 3. Thus, a decision is made that if all bits are "0" then there is no error or otherwise there is an error.

That all bits are "0" means that the read check bits e and write check bits d coincide with each other. The data from exclusive-OR operation described above is referred to as syndrome. This syndrome is a row of data consisting of k bits. The syndrome generating circuit 5 gives syndrome f to the syndrome decoder 6.

The aforesaid syndrome f contains positional information on error bits, and which bit in the m data bits in an error can be found by decoding said positional information by the syndrome decoder 6. In accordance with this, the data correcting circuit 7 corrects or reverses the error bits in the m data bits c and k write check bits d. Generally, it is only $m_0$ bits in the group of m corrected data that become an external data output. In this case, $m_0 \leq m$ bits. Therefore, external output data j outputted from the address decoder 8 are selected and outputted in accordance with address information k inputted to the address decoder 8. In many cases, the address decoder 8 may serve mostly or completely as an access-purpose decoder (not shown).

The write check bit generating circuit 2 and read check bit generating circuit 4 are circuits adapted to produce check bits from the m data bits in accordance with the structure of error checking and correcting code and since the logical operation is the same for both, a common circuit may serve for the two circuits. Further, the syndrome generating circuit 5, as described above, is a circuit adapted to compute the exclusive-OR, bit by bit, of the write check bits d read from the memory cell array 3 and the read check bits e newly generated form the data bits c in the read check bit generating circuit 4. The syndrome decoder 6 is a decoder for converting the k bit syndrome f into a (m+k)-bit code for specifying error bits among the m data bits c and k write check bits d; for example, there will be obtained an output such that among the (m+k) bits, error bit positions alone are "1" and the others are "0".

The data correcting circuit 7 is a circuit for computing the exclusive-OR, bit by bit, of syndrome decode data g to be outputted from the syndrome decoder 6, data bits c to be corrected and write check bits d, whereby error bit data alone is corrected or reversed. The error-corrected (m+k)-bit data h is rewritten to a predetermined address in the memory cell array 3. Further, $m_0$ accessed data bits among the m corrected data bits i are selected by the address decoder 8, serving as external output data j.

The semiconductor memory device having on-chip ECC constructed in the manner described above must have its ECC function tested; that is, the data bit array 31, check bit array 32 and ECC circuit system must be tested. However, the recent advance of the degree of integration of on-chip ECC function-equipped semiconductor memory devices has led to a problem that the time required for these functional tests increases.

SUMMARY OF THE INVENTION

Accordingly, an object of the invention is to provide a semiconductor memory device whose ECC function can be tested in a short time.

In brief, the invention provides switching means which makes it possible to access, directly from the outside, the check bit memory cell array which outputs check bits used for on-chip error detecting and correcting function.

Therefore, according to the invention, since the semiconductor memory device is provided with switching means which makes it possible to access the check bit memory cell array directly from the outside, it is possible to easily conduct functional tests on the check bit memory cell array which is usually not readily accessible from the outside.

A preferred embodiment of the invention comprises data input switching means for effecting switching between write check bits outputted by write check bit generating means on the basis of data bits inputted from the outside and data bits inputted from the outside, data output switching means for deriving write check bits outputted from a check bit memory cell array, and address switching means for effecting switching between an address signal outputted from address generating means and an address signal from the outside, so as to give the selected address signal to the check bit memory cell array.

Therefore, according to the preferred embodiment of the invention, it is possible to give data from the outside to the data bit memory cell array by switching the data input switching means, to derive write check bits outputted from the check bit memor cell array by switching the data output switching means, and to give an address signal from the outside to the check bit memory cell array by switching the address switching means.

According to a preferred embodiment of the invention, on the basis of inputted data bits, write check bits are generated from the write check bit generating means, said write check bits or write check bits generated from the check bit memory cell array are outputted by switching therebetween, and the exclusive-OR of said check bits and the check bits which are inputted immediately before the switching, is computed to thereby test the check bit memory cell array.

Further, according to a preferred embodiment of the invention, two of the three classes of check bits, write check bits generated from the write check bit generating means, write check bits generated from the check bit memory cell array, and read check bits generated from the check bit generating means on the basis of new data bits outputted from the data bit memory cell array, are selectively outputted, and the exclusive-OR of the two classes of outputted check bits is computed to thereby test the check bit memory cell array.

Further, according to a preferred embodiment of the invention, in place of data bits generated from the data bit memory cell array, virtual data bits are given to the read check bit generating circuit, so as to test the ECC circuit system.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 2:
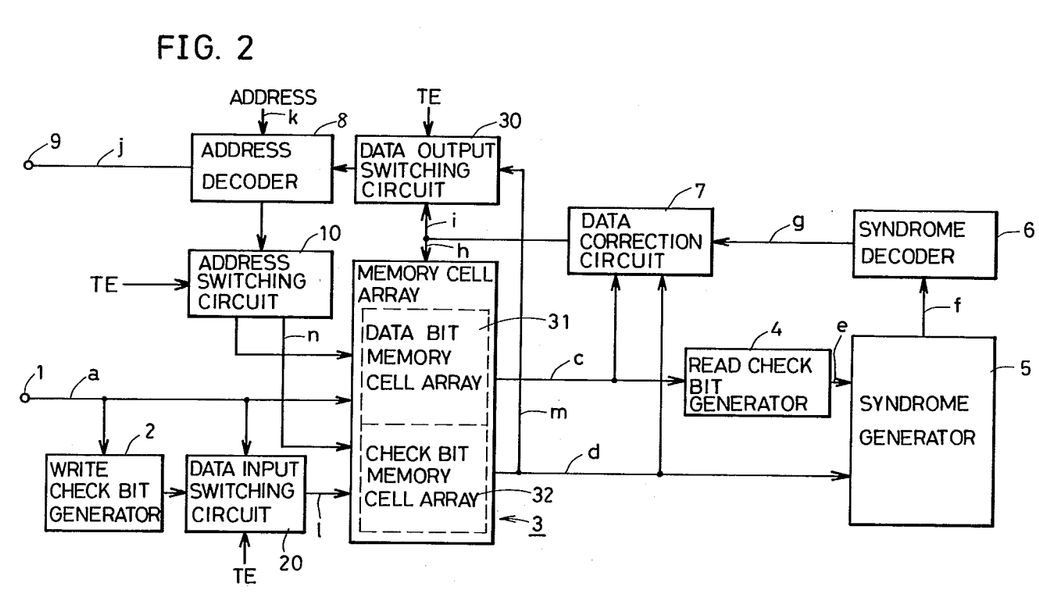
FIG. 2 is a block diagram of a semiconductor memory device according to an embodiment of the invention.
Figure 3:
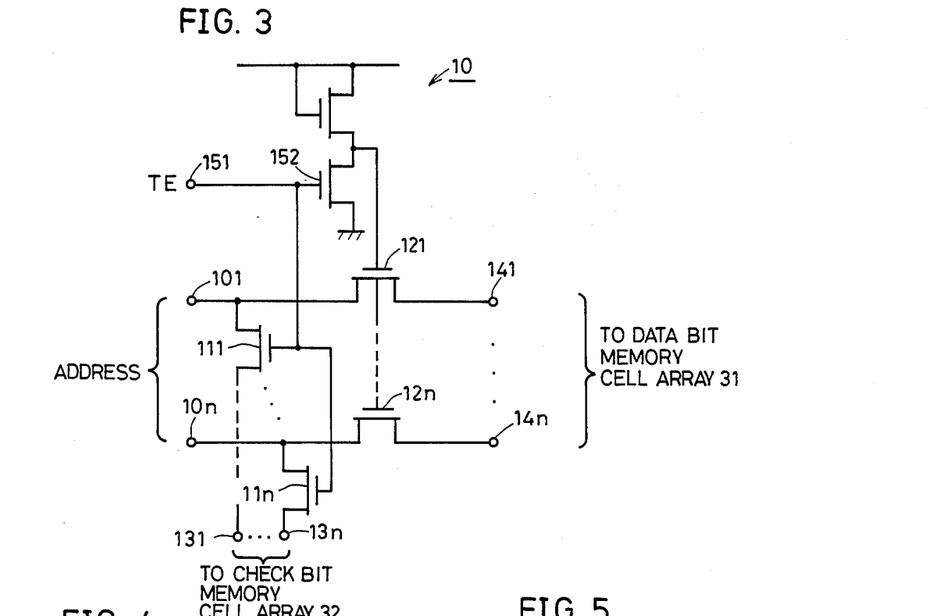
FIG. 3 is an electric circuit diagram showing an example of an address switching circuit shown in FIG. 2.
Figure 4:
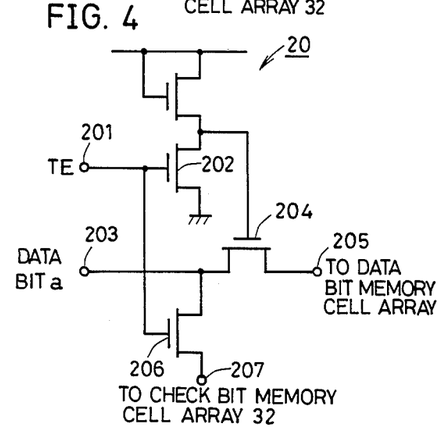
FIG. 4 is an electric circuit diagram showing an example of a data input switching circuit shown in FIG. 2.
Figure 5:
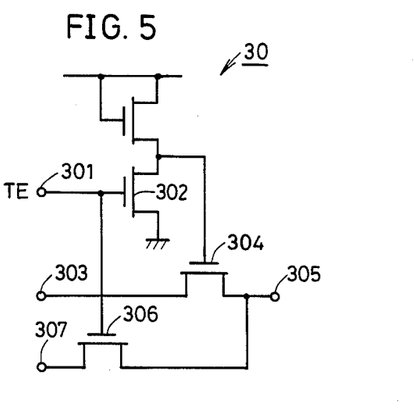
FIG. 5 is an electric circuit diagram showing an example of a data output switching circuit shown in FIG. 2.

FIG. 2 is a block diagram of a semiconductor memory device according to an embodiment of the invention; FIG. 3 is an electric circuit diagram showing an example of an address switching circuit shown in FIG. 2; FIG. 4 is an electric circuit diagram showing an example of a data input switching circuit shown in FIG. 2; and FIG. 5 is an electric circuit diagram showing an example of a data output switching circuit shown in FIG. 2.

The arrangement of an embodiment of the invention will now be described with reference to FIGS. 2 through 5. In addition, the semiconductor memory device shown in FIG. 2 is the same as that shown in FIG. 1 except that an address switching circuit 10 is connected between the address decoder 8 and the memory cell array 3, a data input switching circuit 20 is connected between the output side of the write check bit generating circuit 2 and the input side of the check bit memory cell array 32, and a data output switching circuit 30 is connected between the output side of the data correcting circuit 7 and the input side of the address decoder 8. The address switching circuit 10, which serves to give an address signal to the check bit memory cell array 32 in accordance with an external control signal TE for effecting switching between normal action mode and test mode, is constructed as shown in FIG. 3.

An external control signal TE is inputted to the input terminal 151 of the address switching circuit 10, said external control signal TE being given to a FET 152. Further, an address signal from the address decoder 8 is given to input terminals 101 through 10n. These input terminals 101 through 10n have FETs 111 through 11n and 121 through 12n connected in parallel thereto. If the external control signal TE is not in test mode, that is, it is in normal mode and at "L" level, since FET 152 is not conductive, the FETs 121 through 12n are conductive and the address signal inputted to the input terminals 101 through 10n is given to the data bit memory cell array 31 through output terminals 141 through 14n. When the external control signal TE turns to "H" level and hence to test mode, the FET 152 is rendered conductive while the FETs 151 through 12n are rendered non-conductive, so that the address signal is no longer given to the data bit memory cell array 3. However, the FETs 111 through 11n are rendered conductive in response to the external control signal TE, and the address signal inputted to the input terminals 101 through 10n is given to the check bit memory cell array 32 through output terminals 131 through 13n.

The data input switching circuit 20, which serves to give data bits a to the check bit memory cell array in accordance with the external control signal TE, is constructed in the manner shown in FIG. 4. An external control signal TE is given to the input terminal 201 of the data input switching circuit 20, said external control signal TE being given to the gate of a FET 202. The FET 202 is rendered non-conductive when the external control signal TE turns to normal action mode and conductive when it turns to test mode. Data bits a inputted to an input terminal 203 are parallelly given to FETs 204 and 206. The FET 204 is rendered conductive when in normal action mode while the FET 206 is rendered conductive when in test mode. Therefore, when the external control signal TE is not in test mode, the FET 202 is rendered non-conductive, so that the FET 204 is rendered conductive and the data bits a inputted to the input terminal 203 are given to the data bit memory cell array 31 through an output terminal 205.

When the external control signal TE turns to test mode, the FET 204 is rendered non-conductive and the FET 206 conductive, so that data bits a are given to the check bit memory cell array 32 through an output terminal 207.

The data output circuit 30, which in accordance with the external control signal TE is switched to give either external output-purpose data i from the data correcting circuit 7 or data m from the check bit memory cell array 32 to the address decoder 9, is constructed in the manner shown in FIG. 5.

An external control signal TE is given to the input terminal 301 of the data output circuit 30. This external control signal TE is given to the respective gates of FETs 302 and 306. The FET 302 is not rendered conductive when the external control signal TE is in normal action mode, while the FET 306 is rendered conductive when the external control signal TE is in test mode. External output data i from the data correcting circuit 7 is given to an input terminal 303, while data m from the check bit memory cell array 32 is given to an input terminal 307. In normal action mode, the external control signal TE turns to "L" and the FET 302 is not rendered conductive but the FET 304 is rendered conductive. Thereby, the external output data i from the data correcting circuit 7 inputted to the input terminal 303 is given to the address decoder 8 through an output terminal 305. When the external control signal TE turns to test mode and hence to "H", the FET 302 is rendered conductive, rendering the FET 304 non-conductive. Further, since the FET 306 is rendered conductive, data m from the check bit memory cell array 32 inputted to an input terminal 307 is given to the address decoder 8 through the output terminal 305.

The operation of the embodiment of the invention will now be described. The address switching circuit 10, the data input switching circuit 20 and the data output switching circuit 30 turn to "L" level when the external control signal TE is in normal action mode, performing the operation previously described with reference to FIG. 1, and when the external control signal TE turns to test mode and hence to "H" level, the address signal lines n of the address switching circuit 10, the data input signal line l the data input switching circuit 20 and the data input signal line m of the data output switching circuit 30 are connected to the check bit memory cell array 32. Thereby, the check bit memory cell array 32 becomes accessible from the outside. That is, in accordance with the input address, data can be written to and read from the bits, so that the same functional test as that for the ordinary check bit memory cell array 31 can be conducted.

In addition, the above embodiment refers to an example of an application of the invention to a semiconductor memory device having an ECC circuit system using the Hamming code; however, the invention is not limited thereto but is applicable to any other semiconductor memory devices having a redundant bit memory cell array for ECC such as a horizontal and a vertical parity check systems.

While the embodiment described with reference to FIG. 2 has been directed to the case of testing the check bit memory cell array 32, reference will now be made to the case of conducting functional tests on the data bit memory cell array 31 and the check bit memory cell array 32.

Figure 6:
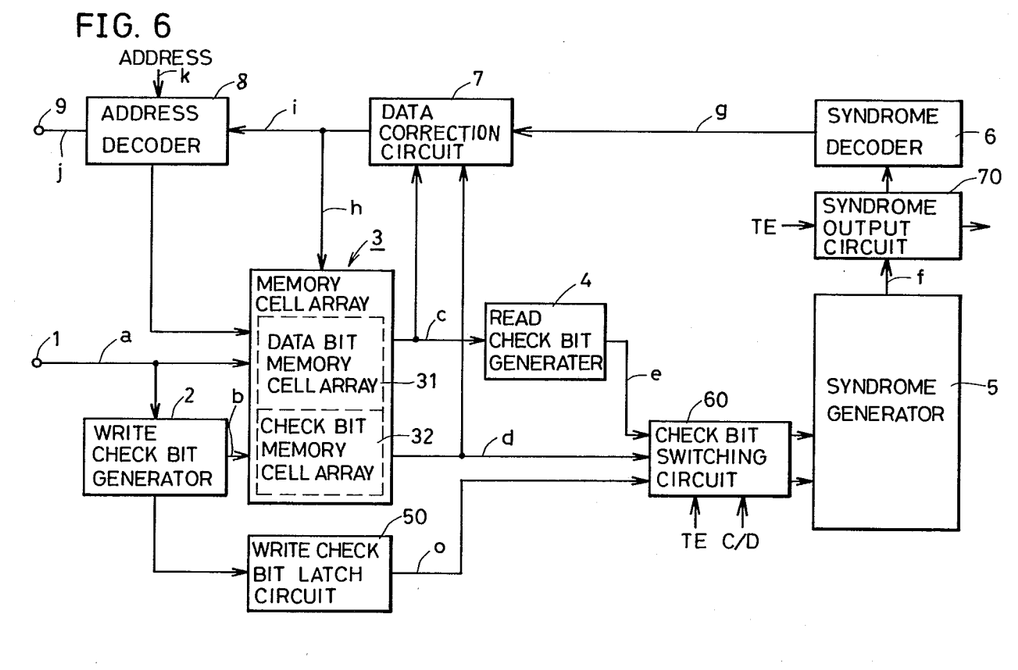
FIG. 6 is a block diagram of a semiconductor memory device according to another embodiment of the invention.
Figure 7:
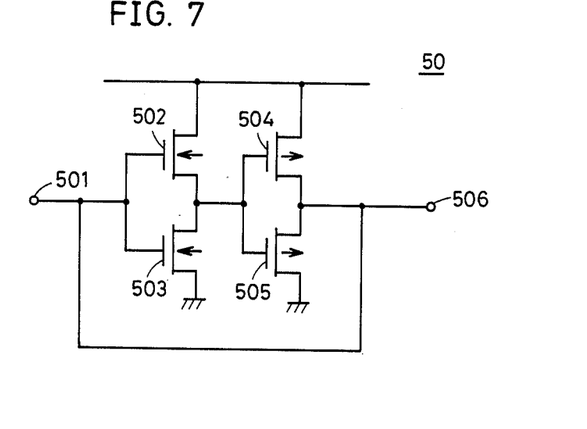
FIG. 7 is an electric circuit diagram shownning the write bit check latch circuit of FIG. 6.
Figure 8:
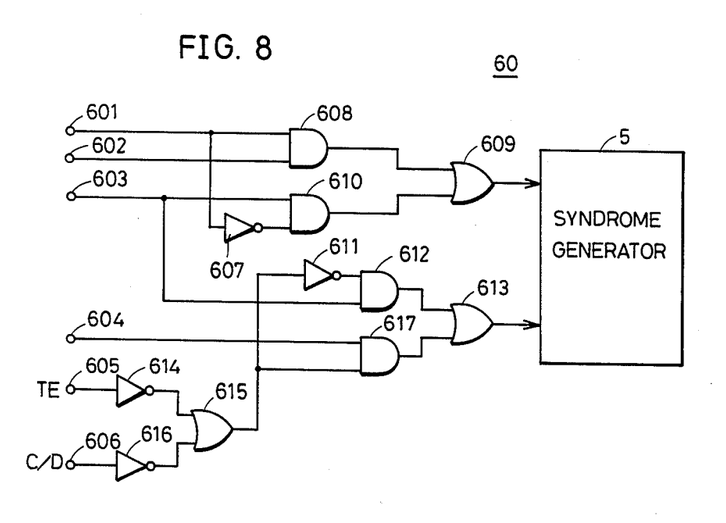
FIG. 8 is an electric circuit diagram showing the check bit switching circuit of FIG. 6.
Figure 9:
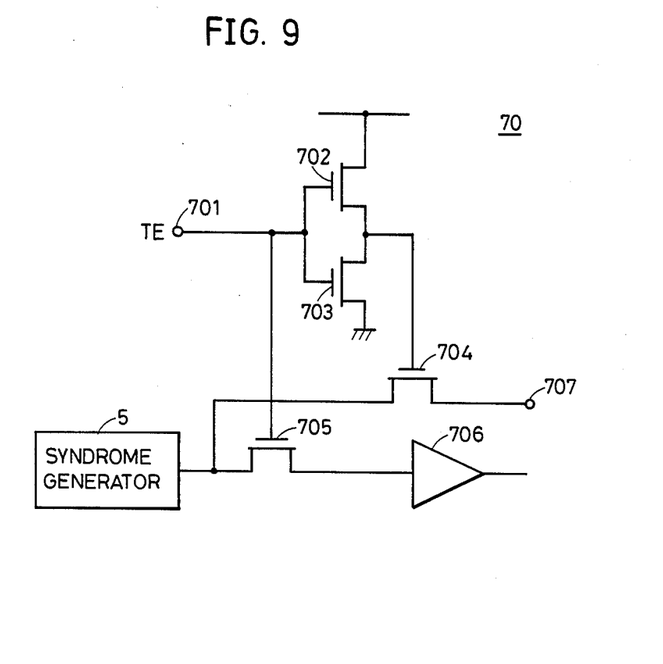
FIG. 9 is an electric circuit diagram showing the syndrome output circuit of FIG. 6.

FIG. 6 is a block diagram of a semiconductor memory device according to another embodiment of the invention; FIG. 7 is an electric circuit diagram showing the write check bit latch circuit of FIG. 6; FIG. 8 is an electric circuit diagram showing the check bit switching circuit of FIG. 6; and FIG. 9 is an electric circuit diagram showing the syndrome output circuit of FIG. 6.

Referring to FIGS. 6 through 9, the arrangement of another embodiment of the invention will now be described. In addition, the embodiment shown in FIG. 6 is the same as the semiconductor memory device described with reference to FIG. 1 except for the provision of a write check bit latch circuit 50, a write check bit switching circuit 60 and a syndrome output circuit 70. The write check bit latch circuit 50, which serves to temporarily store write check bits b generated in the write check bit generating circuit 2 during the writing of data, is constructed in the manner shown in FIG. 7. The write check bit latch circuit 50 includes four FETs 502 through 505 and is adapted to latch write check bits b inputted to an input terminal 501 and output them from an output terminal 506.

The check bit switching circuit 60, as shown in FIG. 6, serves to give the syndrome generating circuit 5 two of the three classes of data, write check bits d from the write check bit memory cell array 32, read check bits e from the read check bits generating circuit 4 and write check bits o from the write check bit generating circuit 50, in accordance with external control signals TE and C/D. The check bit switching circuit 60 is structured, as shown in FIG. 8, for example. An external control singal TE is applied to the input terminal 601 of the check bit switching circuit 60. The write check bits o from the write check bit latch circuit 50 is applied to an input terminal 602. The write check bits d from the check bit memory cell array 32 is applied to an input terminal 603. The read check bits e from the read check bit generating circuit 4 is applied to an input terminal 604. In addition, the external control signal TE is applied to an input terminal 605. The external control signal C/D is applied to an input terminal 606. Further, the check bit switching circuit 60 includes inverters 607, 611, 614 and 616, AND gates 608, 610, 612 and 617, and OR gates 609, 613 and 615.

In normal action mode, the external control signal TE inputted to the input terminals 601 and 605 turns to "L". The external control signal TE at "L" level is inverted by the inverter 607 to "H" level so as to open the AND gate 610. Further, the external control signal TE at "L" level is inverted by the inverter 614 to "H" level and given to the AND gate 617 through the OR gate 615 to open the latter. Thereby, the write check bits o inputted to the input terminal 602 are given to the syndrome generating circuit 5 through the AND gate 610 and OR gate 609 while the read check bits e inputted to the input terminal 604 are given to the syndrome generating circuit 5 through the AND gate 617 and OR gate 613.

In data test mode, the external control signal TE turns to "H" level, while the external control signal C/D turns to "L". As a result of the external control signal TE turning to "H" level, the output o from the write check bit latch circuit 50 inputted to the input terminal 602 is given to the syndrome generating circuit 5 through the AND gate 608 and OR gate 609. The external control signal C/D at "L" level is inverted by the inverter 616 to "H" level, thus opening the AND gate 617 through the OR gate 615. Thereby, the read check bits e inputted to the input terminal 604 are given to the syndrome generating circuit 5 through the AND gate 617 and OR gate 613.

In check bit test mode, the external control signals TE and C/D turn to "H" level and are inverted by the inverters 614 and 616, respectively, to "L". The "L" level signals are given to the OR gate 615, the output from the latter being given to the inverter 611, whereby it is inverted to "H" level to open the AND gate 612. Thereby, the write check bits d inputted to the input terminal 603 are given to the syndrome generating circuit 5 through the AND gate 612 and OR gate 613. Further, since the external control signal TE at "H" level opens the AND gate 608, the output o from the write check bit latch circuit 50 inputted to the input terminal 602 is given to the syndrome generating circuit 5 through the AND gate 608 and OR gate 609.

The syndrome output circuit 70 is constructed in the manner shown in FIG. 9. The syndrome output circuit 70 includes an input terminal 701 having the external control signal TE inputted thereto. This external control signal TE is given to FETs 702 and 703. In normal action mode, the FET 702 is rendered conductive and the FET 703 non-conductive. As a result of the FET 702 being rendered conductive, the FET 704 is rendered conductive and the syndrome f generated in the syndrome generating circuit 5 is given from the FET 704 to the syndrome decoder 6 through the output terminal 707. In data bit test mode and check bit test mode, when the external control signal TE turns to "H", FETs 703 and 705 are rendered conductive and the FET 702 non-conductive. As a result of the FET 703 being rendered conductive, the FET 704 is rendered non-conductive and the syndrome f is outputted from the FET 705 through an output driver 706.

Referring to FIGS. 6 through 9, the operation of the aforesaid embodiment of the invention will now be described.

First, in normal action mode, the external control signal TE turns to "L" level, so that the read check bits e and the write check bits d outputted from the check bit memory cell array 32 are given to the syndrome generating circuit 5 through the check bit switching circuit 60. Thereby, a reading operation with ECC described with reference to FIG. 1 is performed.

Next, in data bit test mode, the external control signal TE turns to "H" level and the external control signal C/D to "L" level. Then, the read check bits e and the signal o outputted from the write check bit latch circuit 50 are given to the syndrome generating circuit 5 through the check bit switching circuit 60. As a result, the read check bits e generated from read check bit generator 4 is compared with the signal o outputted from the write check bit latch circuit 50, so that irrespective of whether the check bit memory cell array 32 is good or bad, the data bit memory cell array 31 can be tested.

In check bit test mode, the external control signal TE turns to "H" level and the external control signal C/D to "H" level. Then, the write check bits d and the signal o outputted from the write check bit latch circuit 50 are given to the syndrome generating circuit 50, whereby irrespective of whether the data bit memory cell array 31 is good or bad, the check bit memory cell array 32 can be tested.

In connection with the switching operation of the check bit switching circuit 60, the syndrome f outputted from the syndrome generating circuit 5 is as follows. In addition, for the sake of simplicity, the error correction code is a 1-bit error correction code.

When the check bit switching circuit 60 is in normal action mode, all bits in the syndrome f become 0 when there is no error. In the case of 1 bit error, some bits in the syndrome f become "1" and are given to the syndrome decoder 6 through the syndrome output circuit 70. Then, syndrome data g is obtained from the syndrome decoder 6 and error correction is made as described with reference to FIG. 1.

In the case where the check bit switching circuit 60 has been switched to data bit test mode, if none of the bits in the syndrome f are "0", there must be an error in the data bits, but if there is an error, this does not necessarily mean that none of the bits are 0. That is, there is a case where even if there is an error, all bits are "0".

In the case where the check bit switching circuit 60 has been switched to check bit test mode, the bit position of the syndrome f corresponding to the error bit in the write check bits d is "1" and the others are "0". Therefore, in this case, all error information (error position and the number of errors) on the write check bits d is included in the syndrome f.

The aforesaid operation, in the case of data bit test mode, makes it possible to determine whether there is surely or possibly an error in the corresponding data bits according to whether all bits in the syndrome f are "0" or not. Further, in the case of check bit test mode, a write check bit d corresponding to the position of the bit associated with the syndrome f being "1" is an error.

In this manner, the check bit memory cell array 32 can be reliably tested to determine whether it is good or bad, and a partial test to determine whether the data bit memory cell array 31 is good or bad becomes possible. The syndrome output circuit 70 outputs the information on syndrome f in test mode obtained in such a manner.

By the aforesaid operation, tests on the check bit memory cell array 32 and data bit memory cell array 31 can be conducted for every k bits and m bits, respectively, so that functional tests on the memory cell array 3 can be efficiently conducted and test time greatly reduced.

In addition, this embodiment also refers to a case where the invention is applied to a semiconductor memory device with ECC system using Hamming code, but the invention is not limited thereto; the invention may be applied to semiconductor memory devices using other systems such as the horizontal and the vertical parity check systems.

Figure 10:
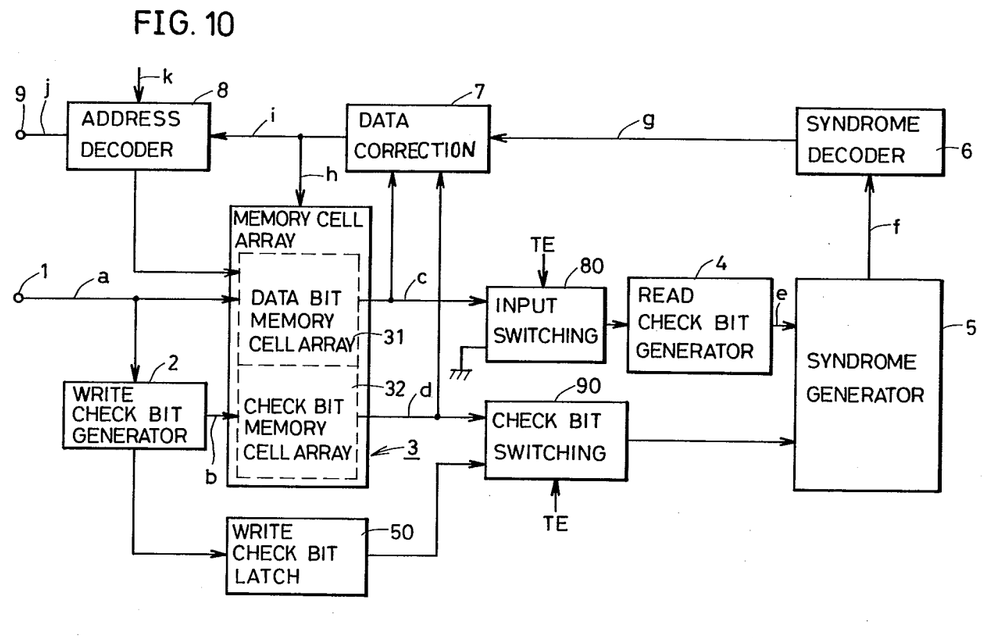
FIG. 10 is a block diagram of a semiconductor memory device according to a further embodiment of the invention.
Figure 11:
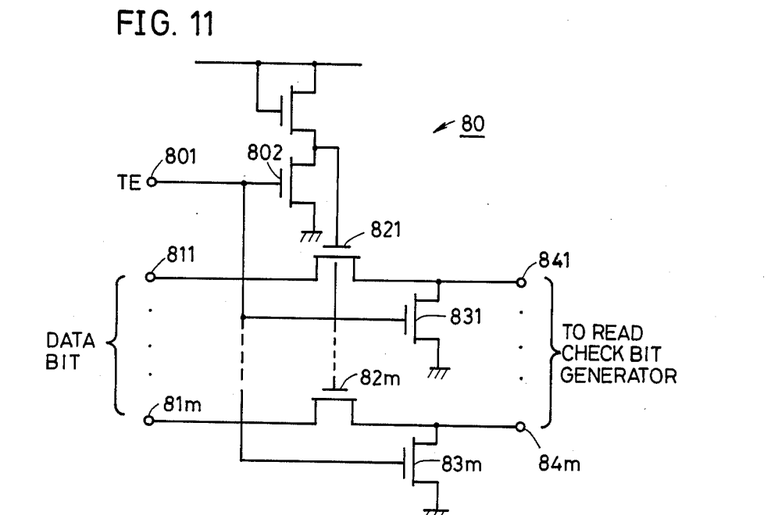
FIG. 11 is an electric circuit diagram showing the input switching circuit of FIG. 10.
Figure 12:
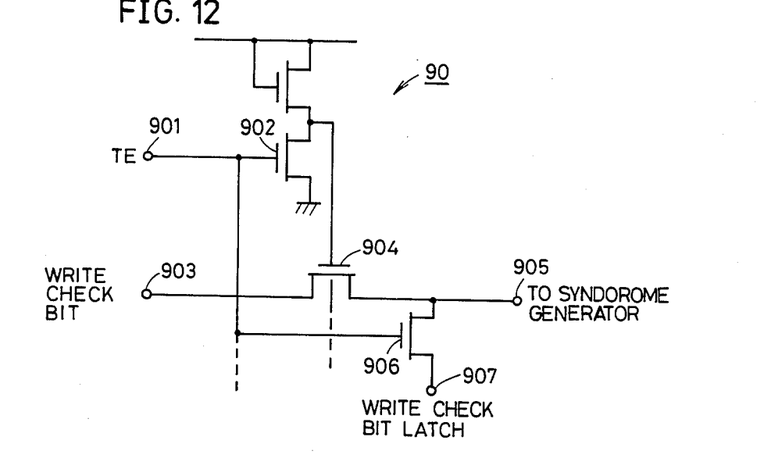
FIG. 12 is an electric circuit diagram of the check bit switching circuit of FIG. 10.

FIG. 10 is a block diagram showing a semiconductor memory device according to another embodiment of the invention; FIG. 11 is an electric circuit diagram of the input switching circuit of FIG. 10; and FIG. 12 is an electric circuit diagram of the check bit switching circuit of FIG. 10.

Referring to FIGS. 10 through 12, the arrangement of the semiconductor memory device will now be described. In addition, FIG. 10 is the same as FIG. 6 except that an input switching circuit 80 is provided between the output side of the check bit memory cell array 31 and the input side of the read check bit memory cell array 4 which provides an output directly to syndrome generator 5. This input switching circuit 80 is constructed in the manner shown in FIG. 11.

An external control signal TE is given to an input terminal 801 included in the input switching circuit 80. This external control signal TE is given to the gate of an FET 802 and the respective gates of FETs 831 through 83m. Further, data bits from the data bit memory cell array 31 are given to input terminals 811 through 81m, these data bits being given to the drains of FETs 821 through 82m. The respective gates of the FETs 821 through 82m are connected to the drain of the FET 802, and the sources of the FETs 821 through 82m are connected to output terminals 841 through 84m. Further, the drains of the FETs 831 through 83m are connected to the output terminals 841 through 84m.

Therefore, when the external control signal TE turns to normal action mode and hence to "L" level, the FET 802 is not rendered conductive but the FETs 821 through 82m are rendered conductive, so that the data bits from the data bit memory cell array 31 are given to the read check bit generating circuit 4 through the output terminals 841 through 84m, causing said read check bit generating circuit 4 to perform the operation previously described with reference to FIG. 1.

When the external control signal TE turns to test mode and hence to "H" level, the FET 802 is rendered conductive, whereby the FETs 821 through 82m are rendered non-conductive. Further, the FETs 831 through 83m are rendered conductive and the output terminals are brought to ground level. That is, when test mode comes on, all bits become "0" and all bits 0 are given as virtual data to the check bit generating circuit 4.

Referring again to FIG. 10, a check bit switching circuit 90 is provided between the check bit memory cell array 32 and the syndrome generating circuit 5. This check bit switching circuit 90 serves to effect switching between the write check bits d outputted from the check bit memory cell array 32 and write check bits o latched in the write check bit latch circuit 50, thereby giving the selected write check bits to the syndrome generating circuit 5. This check bit switching circuit 90 is constructed in the manner shown in FIG. 12. An external control signal TE is given to the input terminal 901 of the check bit switching circuit 90, said external control signal TE being given to the gates of FETs 902 and 906. The drain of the FET 902 is connected to the gate of a FET 904, the drain of said FET 904 being given through an input terminal 903 the write check bits d outputted from the check bit memory cell array 32. Further, the drain of the FET 906 is given through an input terminal 907 the write check bits 0 from the write check bit latch circuit 50. The sources of the FETs 904 and 906 are connected to an output terminal 905.

With the write check bit switching circuit 90 constructed in the manner described above, when the external control signal TE turns to normal action mode and hence to "L" level, the FET 902 is not rendered conductive but the FET 904 is rendered conductive. Thereby, the write check bits d inputted to the input terminal 903 are given to the syndrome generating circuit 5 through the output terminal 905.

When the external control signal TE turns to test mode and hence to "H" level, the FET 902 is rendered conductive, the FET 904 non-conductive and the FET 906 conductive. Thereby, the write check bits o inputted to the input terminal 907 and outputted from the write check bit latch circuit 50 are given to the syndrome generating circuit 5 through the output terminal 905.

The operation of the semiconductor memory device constructed in the manner described above will now be described. During normal action mode, the external control signal TE turns to "L" level. The check bit switching circuit 90, as previously described with reference to FIG. 12, gives the syndrome generating circuit 5 the write check bits d outputted from the check bit memory cell array 32, whereby the normal ECC operation described with reference to FIG. 1 is performed.

When test mode comes on, with the external control signal turning to "H", the write check bit switching circuit 90 gives the syndrome generating circuit 5 the write check bits generated during write operation immediately before they were latched in the write check bit latch circuit 50. The syndrome generating circuit 5 makes a comparison between the write check bits d outputted from the check bit memory cell array 32 and the write check bits o generated during write operation immediately before they were latched in the write check bit latch circuit 50, so as to decide whether or not these bits coincide with each other.

The operation of the input switching circuit 80 will now be described. Suppose that operational tests on the data bit memory cell array 31 and check bit memory cell array 32 by the methods described above and with reference to FIG. 6 have been completed and that it has been ascertained that the memory cell array 3 is a non-defective article. During normal action mode, with the external signal TE turning to "L" level, the data bits e outputted from the data bit memory cell array 31 are given to the check bit generating circuit 4. This operation is the same as that previously described with reference to FIG. 1.

When the external control signal TE turns to "H" level during test mode, virtual data with all bits 0 is inputted to the read check generating circuit 4, as described with reference to FIG. 11. The read check bit generating circuit 4 generates read check bits e with respect to said virtual data. If, therefore, the data with all bits=0 is written to the same ECC circuit system during the immediately preceding write operation, then if the ECC circuit system is operating correctly, no data correction is made of any data bits in question and the corrected data h is all "0". If data with some bits being "0" and others "1" is written during the immediately preceding write operation, data correction will be performed with respect to the bit positions where "1" have been written, and if the corrected data is all "0", it follows that the ECC circuit system is operating correctly. In this manner functional test on the ECC circuit system can be easily made byusing virtual data.

In addition, the above description refers to the case where the virtual data is fixed data with all bits=0, but the invention is not limited thereto. For example, the virtual data may be fixed data with none of the bits=0 or variable data fed in from the outside may be used. Further, in this embodiment also, the invention may be embodied using other check systems such as the horizontal and the vertical parity check systems.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A semiconductor memory device comprising:
 a data bit memory cell array (31), a check bit memory cell aray (32) for outputting write check bits for an on-chip error correcting function,
 switch means (10, 20, 30) for making said check bit memory cell array directly externally accessible, and
 said switch means including input address switching means (10) responsive to external test signals for switching external address signals to one of said data bit and check bit memory cell arrays.

2. A semiconductor memory device as set forth in claim 1, wherein:
 said switch means further includes input data switching means (20) operable during the test mode in response to said external test signals for switching external data bits to one of said data bit and check bit memory cell arrays.

3. A semiconductor memory device as set forth in claim 2, further comprising a data correction circuit means for correcting data output by said data bit memory cell array and said check bit memory cell array,
 said switch menas including output data switching means (30) operable during said test mode in response to said external test signals for providing andoutput signal representative of data output by one of said check bit memory cell array and said data correction circuit means.

4. A semiconductor memory device as set forth in claim 3, wherein said input address switching means comprises first and second groups of switching transistor means each including a control terminal and a pair of conducting terminals controlled thereby, and inverting means for inverting said external test signals,
 each of said switching transistor means having one terminal connected for receiving said input external address signals, the first group of said switching transistor means having respective second terminals thereof connected to said check bit memory cell array and the second group of said switching transistor means having the respective second terminals thereof connected to said data bit memory cell array,
 the control terminals of one of said two groups of switching transistor means connected to receive said external test signals and the control terminals of the other of said two groups of switching transistor means connected to receive outputs of said inverting means,
 whereby one or the other of said two groups of switching transistor means is activated by said external test signals and the other of said two groups of switching transistor means is deactivated by said external test signals,
 thereby connecting said external address signals to said check bit memory cell array or to said data bit memory cell array in response to said external test signals.

5. A semiconductor memory device as set forth in claim 4, wherein said input data bit switching means comprises first and second switching transistor means each including a control terminal and a pair of conducting terminals controlled thereby, and inverting means for inverting said external test signals,
 each of said switching transistor means having one terminal connected for receiving said input external data bit signals, the first of said switching transistor means having a second terminal thereof connected to said check bit memory cell array and the second of said switching transistor means having the second terminal thereof connected to said data bit memory cell array,
 the control terminal of one of said two switching transistor means connected to receive said external test signals and the control terminal of the other of said two switching transistor means connected to receive an output of said inverting means,
 whereby one or the other of said two switching transistor means is activated by said external test signals and the other of said two switching transistor means is deactivated by said external test signals,
 thereby connecting said external data bit signals to said check bit memory cell array or to said data bit memory cell array in response to said external test signals.

6. A semiconductor memory device as set forth in claim 5, wherein said output data switching means comprises first and second switching transistor means each including a control terminal and a pair of conducting terminals controlled thereby, and inverting means for inverting said external test signals,
 each of said switching transistor means having one terminal connected to an output line for providing output data thereto, the first of said switching transistor means having a second terminal thereof connected to receive output data from said check bit memory cell array and the second of said switching transistor means having the second terminal thereof connected to receive output data from said data bit memory cell array,
 the control terminal of one of said two switching transistor means connected to receive said external test signals and the control terminal of the other of said two switching transistor means connected to receive an output of said inverting means, whereby one or the other of said two switching transistor means is activated by said external test signals and the other of said two switching transistor means is deactivated by said external test signals, thereby connecting the output data from said check bit memory cell array or from said data bit memory cell array to the output line in response to said external test signals.

7. A semiconductor memory device as set forth in claim 4, wherein said output data switching means comprises first and second switching transistor means each including a control terminal and a pair of conducting terminals controlled thereby, and inverting means for inverting said external test signals, each of said switching transistor means having one terminal connected to an output line for providing output data thereto, the first of said switching transistor means having a second terminal thereof connected to receive output data from said check bit memory cell array and the second of said switching transistor means having the second terminal thereof connected to receive output data from said data bit memory cell array, the control terminal of one of said two switching transistor means connected to receive said external test signals and the control terminal of the other of said two switching transistor means connected to receive an output of said inverting means, whereby one or the other of said two switching transistor means is activated by said external test signals and the other of said two switching transistor means is deactivated by said external test signals, thereby connecting the output data from said check bit memory cell array or from said data bit memory cell array to the output line in response to said external test signals.

8. A semiconductor memory device as set forth in claim 3, wherein said input data bit switching means comprises first and second switching transistor means each including a control terminal and a pair of conducting terminals controlled thereby, and inverting means for inverting said external test signals, each of said switching transistor means having one terminal connected for receiving said input external data bit signals, the first of said switching transistor means having a second terminal thereof connected to said check bit memory cell array and the second of said switching transistor means having the second terminal thereof connected to said data bit memory cell array, the control terminal of one of said two switching transistor means connected to receive said external test signals and the control terminal of the other of said two switching transistor means connected to receive an output of said inverting means, whereby one or the other of said two switching transistor means is activated by said external test signals and the other of said two switching transistor means is deactivated by said external test signals, thereby connecting said external data bit signals to said check bit memory cell array or to said data bit memory cell array in response to said external test signals.

9. A semiconductor memory device as set forth in claim 8, wherein said output data switching means comprises first and second switching transistor means each including a control terminal and a pair of conducting terminals controlled thereby, and inverting means for inverting said external test signals, each of said switching transistor means having one terminal connected to an output line for providing output data thereto, the first of said switching transistor means having a second terminal thereof connected to receive output data from said check bit memory cell array and the second of said switching transistor means having the second terminal thereof connected to receive output data from said data bit memory cell array, the control terminal of one of said two switching transistor means connected to receive said external test signals and the control terminal of the other of said two switching transistor means connected to receive an output of said inverting means, whereby one or the other of said two switching transistor means is activated by said external test signals and the other of said two switching transistor means is deactivated by said external test signals, thereby connecting the output data from said check bit memory cell array or from said data bit memory cell array to the output line in response to said external test signals.

10. A semiconductor memory device as set fort in claim 3, wherein said output data switching means comprises first and second switching transistor means each including a control terminal and a pair of conducting terminals controlled thereby, and inverting means for inverting said external test signals, each of said switching transistor means having one terminal connected to an output line for providing output data thereto, the first of said switching transistor means having a second terminal thereof connected to receive output data from said check bit memory cell array and the second of said switching transistor means having the second terminal thereof connected to receive output data from said data bit memory cell array, the control terminal of one of said two switching transistor means connected to receive said external test signals and the control terminal of the other of said two switching transistor means connected to receive an output of said inverting means, whereby one or the other of said two switching transistor means is activated by said external test siganls and the other of said two switching transistor means is deactivated by said external test signals, thereby connecting the output data from said check bit memory cell array or from said data bit memory cell array to the output line in response to said external test signals.

11. A semiconductor memory device as set forth in claim 2, wherein said input data bit switching means comprises first and second switching transistor means each including a control terminal and a pair of conducting terminals controlled thereby, and inverting means for inverting said external test signals, each of said switching transitor means having one terminal connected for receiving said input external data bit signals, the first of said switching transistor means having a second terminal thereof connected to said check bit memory cell array and the second of said switching transistor means having the second terminal thereof connected to said data bit memory cell array, the control terminal of one of said two switching transistor means connected to receive said external test signals and the control terminal of the other of said two switching transistor means connected to receive an output of said inverting means, whereby one or the other of said two switching transistor means is activated by said external test signals and the other of said two switching transistor means is deactivated by said external test signals, thereby connecting said external data bit signals to said check bit memory cell array or to said data bit memory cell array in response to said external test signals.

12. A semiconductor memory device as set forth in claim 1, wherein said input address switching means comprises first and second groups of switching transistor means each including a control terminal and a pair of conducting terminals controlled thereby, and inverting means for inverting said external test signals, each of said switching transistor means having one terminal connected for receiving said input external address signals, the first group of said switching transistor means having respective second terminals thereof connected to said check bit memory cell array and the second group of said switching transistor means having the respective second terminals thereof connected to said data bit memory cell array, the control terminals of one of said two groups of switching transistor means connected to receive said external test signals and the control terminals of the other of said two groups of switching transistor means connected to receive outputs of said inverting means, whereby one or the other of said two groups of switching transistor means is activated by said external test signals and the other of said two groups of switching transistor means is deactivated by said external test signals, thereby connecting said external address signals to said check bit memory cell array or to said data bit memory cell array in response to said external test signals.

13. A semiconductor memory device comprising:
a check bit memory cell array (32) for outputting write check bits for an on-chip error correcting function,
said check bit memory cell array including an address signal line, a data input signal line and a data output signal line,
switch means (10, 20, 30) for making said check bit memory cell array directly externally accessible,
said switch means including means (10, 20, 30) operable for conveying an external address signal to said address signal line during a test mode, means for conveying external data to said data input signal line and means for conveying outputted data to said data output signal line,
a write check bit generating circuit means (2) for generating write check bits on the basis of external data bits input thereto,
said switch menas including a data input switching means (20) for effecting selective switching between said external data bits and the write check bits generated by said write check bit generating circuit means, thereby providing the selected bits to the data input signal line of said check bit memory cell array.

14. A semiconductor memory device as set forth in claim 13, wherein:

said switch means includes data output switching means (30) for outputting externally the write check bits outputted by said check bit memory cell array.

15. A semiconductor memory device as set forth in claim 13, further including:
address generating means (8), thereby giving the selected address signal to the address signal line of said check bit memory cell array.

16. A semiconductor memory device with an on-chip error correcting function, comprising:
write check bit generating means (2) for generating write check bits on the basis of inputted data bits,
data input switching means (20) for effecting switching between said write check bits generated from said write check bit generating means and said inputted data bits to thereby output the selected bits,
a data bit memory cell array (31) for storing said inputted data bits and outputting new data bits on the basis of the stored data bits,
a check bit memory cell array (32) for generating new check bits on the basis of the write check bits generated from said write check bit generating means,
address signal generating means (8) for generating address signals used to specify said data bit memory cell array (31) and said check bit memory cell array (32),
address switching means (10) for effecting switching between the address signal from address siganl generating means and the address signal from the outside, thereby giving the selected address signal to said data bit memory cell array (31) and said check bit memory cell array (32),
read check bit generating means (4) for generating read check bits on the basis of new data bits from said data bit memory cell array,
syndrome generating circuit (5) for computing the exclusive-OR of the new write check bits from said check bit memory cell array and the check bits generated by said read check bit generating means,
data correcting means (7) for correcting data stored in said data bit memory cell array on the basis of the syndrome generated from said syndrome generating means, and
data output switching means (30) for effecting switching between check bits outputted from said check bit memory cell array and the output of said data correcting means (7).

17. A semiconductor memory device with an on-chip error correcting function comprising:
write check bit generating means (2) for generating write check bits on the basis of inputted data bits,
a data bit memory cell array (31) for storing said inputted data bits and outputting new data bits on the basis of the stored data bits, (continued)
a check bit memory cell array (32) for generating new check bits on the basis of the write check bits generated from said write check bit generating means,
read check bit generating means (4) for generating read check bits on the basis of new data bits from said data bit memory cell array,
check bit switching means (90) for effecting selective switching between at least the write check bits generated from said write check bit generating means and the write check bits generated from said check bit memory cell array (32), and exclusive-OR operation means (5) for computing the exclusive-OR of the two classes of check bits outputted from said check bit switching means.

18. A semiconductor memory device as set forth in claim 17, wherein:
said check bit switching means includes means (60) for selectively outputting two of the three classes of bits, the write check bits generated from said write check bit generating means (2), the write check bits generated from said check bit memory cell array (32) and the read check bits generated from said read check bit generating means.

19. A semiconductor memory device as set forth in claim 17, further including write check bit memory means (50) for storing the write check bits generated by said write check bit generating means and for providing the stored bits to said check bit switching means.

20. A semiconductor memory device as set forth in claim 17, further including input switching means (80) for effecting switching between the new data bits outputted from said data bit memory cell array and virtual data bits, so as to give the selected bits to said read check bit generating means.

21. A semiconductor memory device as set forth in claim 20, wherein:
said input switching means includes means (10) for effecting switching between said new data bits and virtual data bits.

22. A semiconductor memory device as recited in claim 20, further including write check bit memory means (50) for storing write check bits generated by said write check bit generating means and for providing the stored bits to said check bit switching means.

* * * * *